United States Patent
Cai et al.

(10) Patent No.: US 8,563,160 B2
(45) Date of Patent: Oct. 22, 2013

(54) INTERCONNECT MEMBER FOR A BATTERY MODULE

(75) Inventors: Wayne W. Cai, Troy, MI (US); Susan M. Smyth, Rochester Hills, MI (US); Robert S. Bucchi, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 13/005,749

(22) Filed: Jan. 13, 2011

(65) Prior Publication Data

US 2011/0189532 A1   Aug. 4, 2011

Related U.S. Application Data

(60) Provisional application No. 61/299,403, filed on Jan. 29, 2010.

(51) Int. Cl.
*H01M 2/22* (2006.01)
*B32B 3/10* (2006.01)

(52) U.S. Cl.
USPC ............................. 429/158; 428/596; 428/614

(58) Field of Classification Search
USPC ........... 429/158, 159, 160; 428/596, 614, 622
See application file for complete search history.

(56) References Cited

U.S. PATENT DOCUMENTS

| | | | | |
|---|---|---|---|---|
| 3,826,629 A * | 7/1974 | Pryor et al. | ................ | 428/622 X |
| 7,416,789 B2 * | 8/2008 | Breit et al. | ..................... | 428/614 |
| 8,110,302 B2 * | 2/2012 | Nakashima et al. | ........... | 429/158 |
| 8,293,399 B2 * | 10/2012 | Lai et al. | ................... | 429/158 X |
| 2010/0015519 A1 * | 1/2010 | Trester et al. | ................ | 429/160 |

* cited by examiner

*Primary Examiner* — Stephen J. Kalafut
(74) *Attorney, Agent, or Firm* — Quinn Law Group, PLLC

(57) ABSTRACT

An interconnect member for use in a vibration welded battery module having a battery tab includes a portion weldable to the battery tab, and an inlay. The inlay is positioned with respect to the portion. The inlay may be the same material as the portion, with an insulating or heat-deterring outer ring, or may be the same material as the battery tab with or without the outer ring. Voids or openings may be provided in the interconnect member to reduce the thermal mass of the interconnect member. The voids may be defined by laminated or clad layers of the portion, and may be filled with an insulating material. A battery module is also disclosed having the battery tabs and the interconnect member noted above.

18 Claims, 2 Drawing Sheets

INTERCONNECT MEMBER FOR A BATTERY MODULE

CROSS-REFERENCE TO RELATED APPLICATIONS

This application claims the benefit of U.S. Provisional Patent Application No. 61/299,403, which was filed on Jan. 29, 2010, and which is hereby incorporated by reference in its entirety.

TECHNICAL FIELD

The present invention relates to an interconnect member design for connecting conductive battery tabs of a battery module.

BACKGROUND

The process of vibration welding uses a sonotrode to apply calibrated oscillations or vibrations to adjacent work pieces. The vibrations create substantial surface friction at interfacing surfaces of the work pieces. Heat resulting from the generated friction softens the interfacing surfaces. A solid-state weld is formed when the materials ultimately cool. Ultrasonic welding and other vibration welding techniques can have tremendous utility in manufacturing. However, the efficiency, consistency, and weld reliability/durability of a vibration-welded part vary with the methodology and design of the various welding tools and work piece components used in the vibration welding process. This is particularly true when vibration welding conductive battery tabs of a battery module to a bus bar or interconnect member.

SUMMARY

An interconnect member is provided herein for use with a battery module. As explained herein, the interconnect member can be used to reduce heat dissipation and/or to provide like-material welding. The interconnect member includes a set of inlays. The materials of the inlays are selected to allow, for example, battery tabs of the battery module to be optimally welded to a designated portion of the interconnect member, e.g., a wall, floor, etc. The interconnect member can be a composite, or may be laminated/clad in another embodiment. In yet another embodiment, the inlay may include an outer ring of insulating or heat-deterring material at its perimeter to reduce heat dissipation from a weld spot as it is being welded. For instance, when the interconnect member is constructed of copper, one may use a ringed copper inlay with a heat-deterring outer ring of another material for welding to a copper battery tab. The ring can help retain heat at the locus of the weld spot.

Materials of the interconnect member, e.g., the side wall(s) or other desired portion(s), can be reduced, provided, and/or removed in various strategic locations in order to create openings or voids. These voids reduce the thermal and structural mass of the interconnect member, and hence the heat sink effect of materials surrounding the welding interface. In another embodiment, the interconnect member may be constructed of laminated or clad layers, e.g., with lower conductive materials, or with insulating materials, in order to further reduce the rate of heat dissipation from the weld spot.

A battery module is one example of a component that may be advantageously vibration welded. Such a battery module can be used as a source of high-voltage electrical power in the powertrains of emerging hybrid gasoline/electric vehicles (HEV), extended-range electric vehicles (EREV), and battery electric vehicles (BEV). The conductive electrode extensions or battery tabs of the various battery cells can be vibration welded together, as well as to a conductive bus bar or interconnect member.

In particular, an interconnect member of a first material for use in a vibration welded battery module having a battery tab. The interconnect member includes a portion that is weldable to the battery tab, and an inlay positioned with respect to the portion. The inlay is substantially constructed of either the first material, with an insulating or heat-deterring outer ring to minimize a rate of thermal dissipation away from a weld spot formed at the inlay when the interconnect member is vibration welded to the battery tab, or the second material, with or without the outer ring, in order to provide like-material welding between the portion and the battery tab, and potentially minimize a rate of thermal dissipation.

A vibration welded battery module is also disclosed which includes a battery tab constructed of one of a first and a second material, and an interconnect member constructed of the first material. The interconnect member has a portion that is vibration welded to the battery tab, and an inlay positioned with respect to the portion. The inlay is configured to minimize a rate of thermal dissipation away from a weld spot formed at the inlay when the interconnect member is vibration welded to the battery tab. The inlay is constructed substantially of either the first material, with an insulating or heat-deterring outer ring, or a second material when the battery tab is constructed of the second material, in order to provide like-material welding between the conductive portion and the battery tab, and potentially minimize a rate of thermal dissipation.

The above features and advantages and other features and advantages of the present invention are readily apparent from the following detailed description of the best modes for carrying out the invention when taken in connection with the accompanying drawings.

DESCRIPTION

Figure 1:
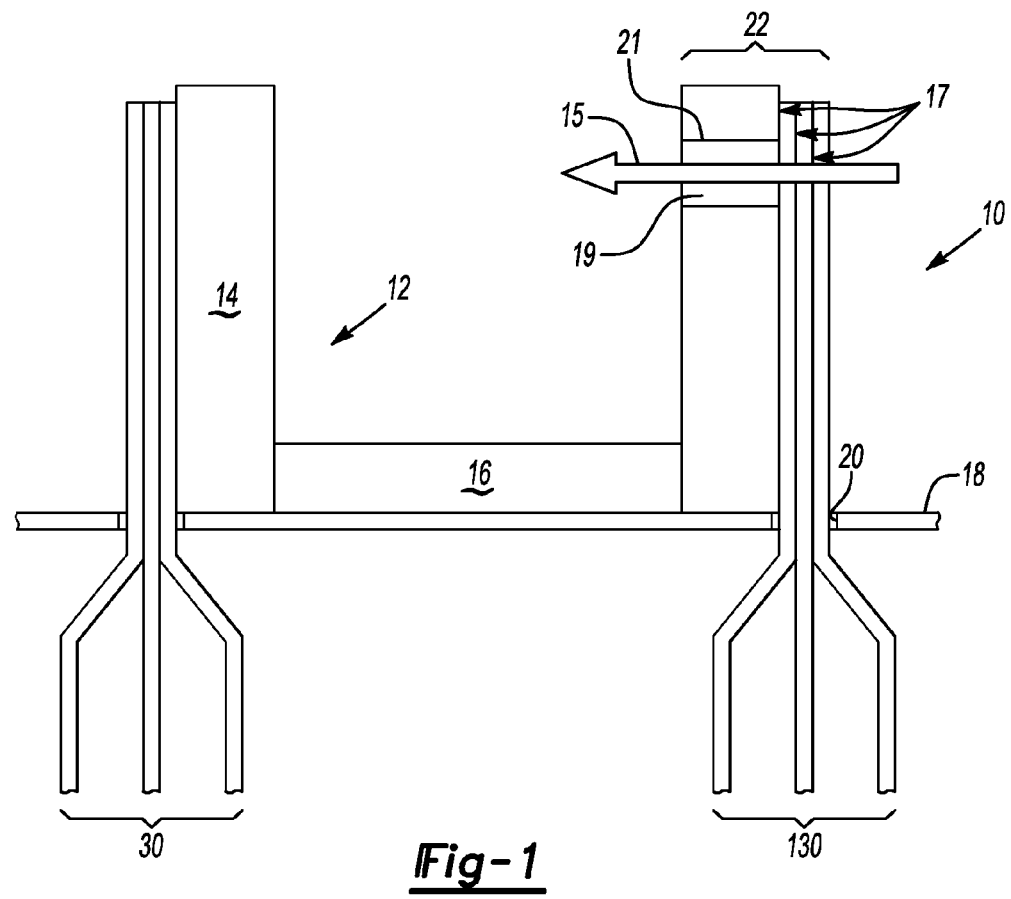
FIG. 1 is a schematic side view illustration of a conductive bus bar or interconnect member and portions of a multi-cell battery module, including battery tabs.

Referring to the drawings, wherein like reference numbers refer to like components, and beginning with FIG. 1, a battery module 10 includes a bus bar or interconnect member 12 configured as set forth herein. The interconnect member 12 includes one or more inlays 19 that reduce heat dissipation and/or provide like-material welding at a designated conductive portion 14, e.g., a wall or other desired portion. In one possible embodiment, a floor 16 may be flanked by two portions 14, although other interconnect designs can be used with the inlay(s) 19, e.g., W-shaped, beam shaped, strips of metal, etc. In each of the following embodiments, at least one inlay 19 is positioned within or on a designated portion 14, with each inlay 19 being as large as or larger than a weld spot being formed thereon.

The interconnect member 12 may be used as part of a multi-cell battery in one possible embodiment. For simplicity, only the interconnect member 12, an interconnect board 18, and respective tabs 30,130 of the battery module 10 are shown in FIG. 1. The interconnect member 12 may be constructed of a suitable conductive material, typically an elemental metal such as copper or aluminum, although composite materials and/or metal alloys may be used depending on the design. The tabs 30, 130 extend toward the interconnect member 12 through slots 20 or other openings defined by the interconnect board 18, and are vibration welded to the portion 14 at the inlays 19 where used, and directly to the portion 14 where the inlays 19 are not used.

Potential applications for the battery module 10 shown in FIG. 1 include propulsion of a hybrid electric vehicle (HEV), an electric vehicle (EV), a plug-in hybrid electric vehicle (PHEV), and the like. In such an embodiment, the battery module 10 could be rated for approximately 300 VDC or more, or any suitable voltage rating suitable for energizing one or more high-voltage traction motors (not shown).

Work pieces 22 to be vibration welded together may include a conductive portion 14 of the interconnect member 12 and the tabs 30 or 130 that are welded to that particular portion 14. As is well understood in the art, the work pieces 22 are first clamped between a vibrating sonotrode or welding horn and a welding anvil (not shown). The sonotrode then vibrates at a calibrated frequency and amplitude. This in turn generates substantial friction and heat at the various welding interfaces 17.

Figure 4:
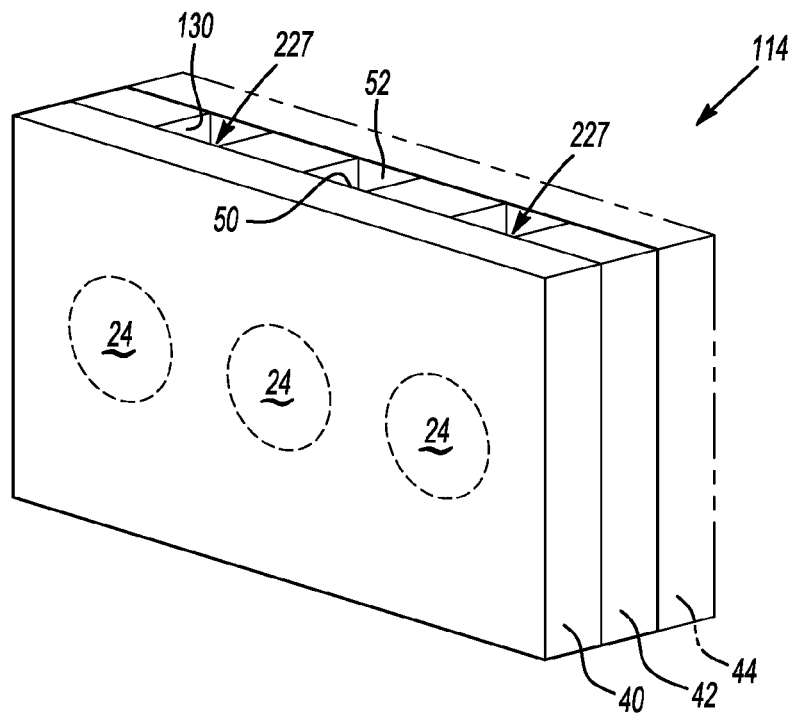
FIG. 4 is a laminated portion usable with the interconnect member of FIGS. 1 and 2.

However, the interconnect member 12 and the welding tools used to weld the interconnect member 12 to the tabs 30, 130 can act as heat sinks Heat is thus dissipated away from the locus of the sets of weld 24, e.g., a series of weld spots as shown in FIG. 4, as energy transmits into the work pieces 22 via the sonotrode (not shown) in the direction of arrow 15. The interconnect member 12 in its various embodiments can minimize the rate of such heat dissipation, and to provide like-material welding as will now be explained with reference to FIG. 2.

Figure 2:
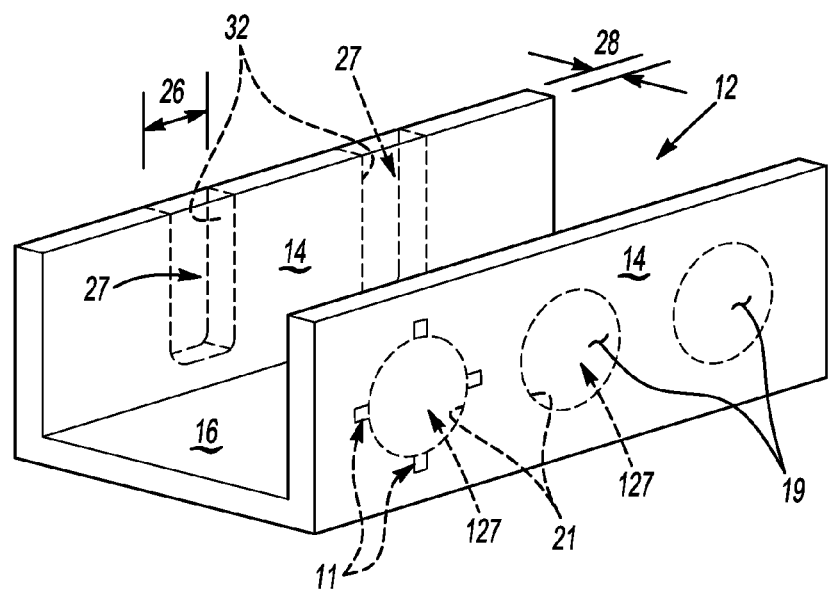
FIG. 2 is a schematic perspective side view illustration of an interconnect member having inlays and optional openings or voids for reducing the thermal mass of the interconnect member according to one possible embodiment.

Referring to FIG. 2, the inlays 19 may be constructed of different materials as the interconnect member 12 in one embodiment. For example, if the interconnect member 12 is constructed of copper, inlays 19 of aluminum may positioned within an opening (arrows 27) defined by a recess or cutout 21 in the portion 14, or vice versa. The inlays 19 of aluminum could be vibration welded to an aluminum sheet, e.g., a battery tab. Alternately, inlays 19 of the same material as the interconnect member 12 could be used as described below with reference to FIG. 3.

Still referring to FIG. 2, each opening (arrow 27) may defined by portion 14 of the interconnect member 12, e.g., a designated wall or other portion. Alternately, the inlays 19 may be laminated or clad to or otherwise positioned on the portion 14. As shown in phantom, the inlays 19 may optionally include any number of tabular extensions 11 or other features that provide additional surface area and/or geometry sufficient for securing the inlays 19 with respect to the interconnect member 12. The interconnect member 12 may be prepared ahead of welding via laser cutting, stamping, or other means to form the wall 21 defining the openings (arrows 127) into which the inlays 19 may be press-fitted, and/or with respect to which the inlays 19 may be laminated, clad, welded, bonded, or otherwise secured to the interconnect member 12.

As noted above, in one possible embodiment the interconnect member 12 may be constructed of aluminum. Aluminum provides a low mass and cost relative to copper. Only one set of tabs 30 or 130 is typically constructed of the same elemental material as the interconnect member 12. The tabs 30 thus may be constructed of aluminum, and the tabs 130 may be constructed of copper. The thermal conductivity of aluminum is approximately 63% that of copper. Therefore, use of inlays 19 constructed of copper in conjunction with an interconnect member 12 of the same material can therefore provide a like-material welding benefit relative to an all-aluminum interconnect member 12.

The shape of the inlays 19 may likewise vary with the design, such as the ovals shown, or alternatively circular, annular, rectangular, etc. While inlays 19 of copper and aluminum may be used as explained above, those of ordinary skill in the art will appreciate that alloys or combinations of these or other materials, including composite materials or alloys, may also be used to achieve the desired weld quality.

Figure 3:
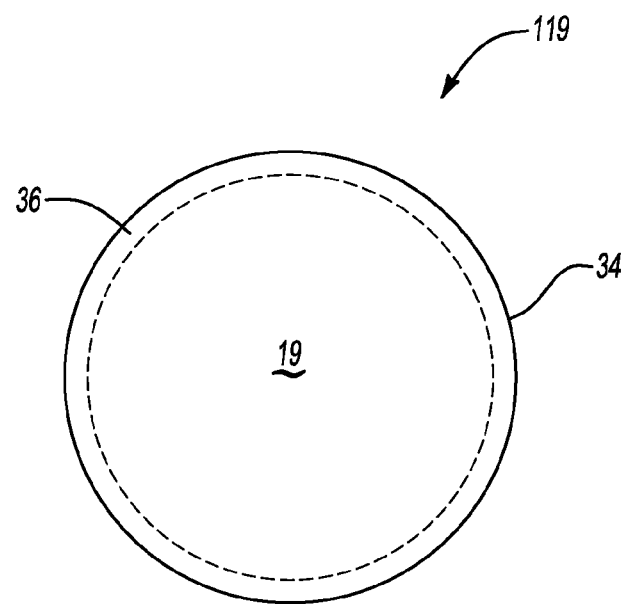
FIG. 3 is a schematic illustration a schematic illustration of an optional inlay having an outer insulating or heat-deterring ring.

Referring briefly to FIG. 3, in one possible embodiment a ringed inlay 119 may include a heat deterring/insulating ring 36 positioned at the outer perimeter 34 of the inlay 19, regardless of the material of the inlay 19. The ringed inlay 119 may enable use of a copper inlay 19, for example, in a copper interconnect member 12 (see FIGS. 1 and 2). In this example, the material of the ring 36 may be aluminum, alloys, another metal, or a suitable insulating or heat-deterring material. The use of the ring 36 with the inlay 19 to form a ringed inlay 119 can help retain heat at the locus of the weld spot being formed.

Referring again to FIG. 2, in another embodiment, material of the interconnect member 12 may be optionally reduced and/or removed from the thickness (arrows 28) of the portion 14 or other areas in order to form voids or openings (arrow 127) of a width (arrows 26). The opening (arrows 127) help to reduce the thermal mass of the interconnect member 12. The openings (arrows 127) may be slot-shaped as shown, or any other desired shape. The openings (arrows 127) may be positioned anywhere on the interconnect member 12, but may be more effective when they are positioned closer to the weld spots. While not shown in FIG. 2 for clarity, the openings (arrows 127) may also be positioned on the same portion 14 as the inlays 19, i.e., between the inlays 19.

Referring to FIG. 4, in another embodiment, the interconnect members 12 may include at least one multi-layered laminated or clad member, e.g., a portion 114. In one embodiment, a first and a second layer 40 and 42 may be laminated or clad together to form a 2-layer design. For instance, the first layer 40 may be constructed of copper, and the second layer 42 may be constructed of aluminum. In this example, welds or weld spots 24 are formed joining the aluminum second layer 42 with the aluminum conductive tabs 130 (see FIG. 3). Thus, the thickness of the portion 114 may be a composite or laminated, optionally defining openings (arrows 227) between layers of lamination.

For instance, the first and second layers 40 and 42 may be laminated together with a third layer 44 to thereby form a 3-layer design. The inner layer, i.e., second layer 42, may be a solid plate, or it may define openings (arrows 227) in conjunction with facing surfaces 50, 52 of the first and third layers 40 and 44, respectively. The openings (arrows 227) may be slot-shaped, or they may extend the entire width of the laminated portion 114.

In another possible embodiment, the openings (arrows 227) may be filled with a suitable insulator, or a less conductive metal, for instance air or an insulating material such as insulating foam, glass, or ceramic. In the embodiment shown in FIG. 3, the size of the opening (arrows 227), as well as their placement and the materials of the insulator used therein, may provide highly customizable localized heating properties at or near the welding interfaces 17 (see FIG. 1) in close proximity to the weld spots 24. Sufficient insulation near the weld spots 24 can help retain useful heat in the locus of the weld.

While the best modes for carrying out the invention have been described in detail, those familiar with the art to which this invention relates will recognize various alternative designs and embodiments for practicing the invention within the scope of the appended claims.

The invention claimed is:

1. An interconnect member constructed of a first metal material for use in a vibration welded battery module having a battery tab, the interconnect member comprising:
   a portion constructed of the first metal material that is weldable to the battery tab; and
   a circular inlay positioned within the portion;
   wherein the circular inlay is constructed substantially of:
      the first metal material or a second metal material and;
      an insulating or heat-deterring outer ring circumscribing the first material or the second material and configured to retain heat from welding of the battery tab within an area of the circular inlay.

2. The interconnect member of claim 1, wherein the circular inlay is substantially constructed of the second material.

3. The interconnect member of claim 1, wherein the portion includes a first layer and a second layer that are laminated or clad together, and which define a void between the first and the second layer for reducing the thermal mass of the interconnect member.

4. The interconnect member of claim 1, wherein the first material is one of copper and aluminum, and wherein the second material is the other one of copper and aluminum.

5. The interconnect member of claim 1, wherein the portion is laminated or clad from a plurality of layers.

6. The interconnect member of claim 5, wherein at least one of the layers is one of copper and aluminum.

7. The interconnect member of claim 5, wherein the laminated or clad layers include a first layer, a second layer, and a third layer, with the second layer positioned between the first and the third layer, and wherein a set of openings or voids are at least partially defined by the layers.

8. A vibration welded battery module, comprising:
   a battery tab constructed of one of a first and a second material; and
   an interconnect member constructed of the first material, and having:
      a conductive portion that is vibration welded to the battery tab; and
      an inlay positioned with respect to the conductive portion, wherein the inlay is constructed substantially of one of:
         the first material, with an insulating or heat-deterring outer ring; and
         a second material when the battery tab is constructed of the second material.

9. The battery module of claim 8, wherein the conductive portion defines a plurality of openings or voids that reduce the thermal mass of the interconnect member.

10. The battery module of claim 8, wherein the first material is one of copper and aluminum, and wherein the second material is the other one of copper and aluminum.

11. The battery module of claim 8, wherein the conductive portion includes laminated or clad layers.

12. The battery module of claim 11, wherein the laminated or clad layers include at least one of a copper layer and an aluminum layer.

13. The battery module of claim 11, wherein the laminated or clad layers include a first layer, a second layer positioned adjacent to the first layer, and a third layer positioned adjacent to the second layer, and wherein openings or voids are defined by the first layer, the second layer, and the third layer.

14. The battery module of claim 13, further comprising an insulating material positioned within the openings or voids.

15. The battery module of claim 14, wherein the insulating material is constructed of one of insulating foam, glass, and ceramic material.

16. An interconnect member constructed of copper for use in a vibration welded battery module having a battery tab, at least one of which is constructed of aluminum, the interconnect member comprising:
   a pair of walls each defining a plurality of openings;
   a first plurality of inlays each constructed of copper and each positioned within a corresponding one of the openings in one of the walls;
   a second plurality of inlays each constructed of aluminum and each positioned within a corresponding one of the openings in the other of the walls, wherein the inlays of aluminum are weldable to the at least one battery tab that is constructed of aluminum; and
   a plurality of insulating or heat-deterring portions each surrounding a corresponding one of the first and the second plurality of inlays.

17. The interconnect member of claim 16, wherein each of the walls includes a first and a second layer that are laminated together, and wherein the first and second layers define at least one void between the first and the second layer, wherein the at least one void is filled with an insulating material.

18. The interconnect member of claim 1, wherein the inlay is substantially constructed of the first material.

* * * * *